No. 827,011. PATENTED JULY 24, 1906.
C. C. GRIFFIN.
PIPE GRIP.
APPLICATION FILED NOV. 28, 1905.
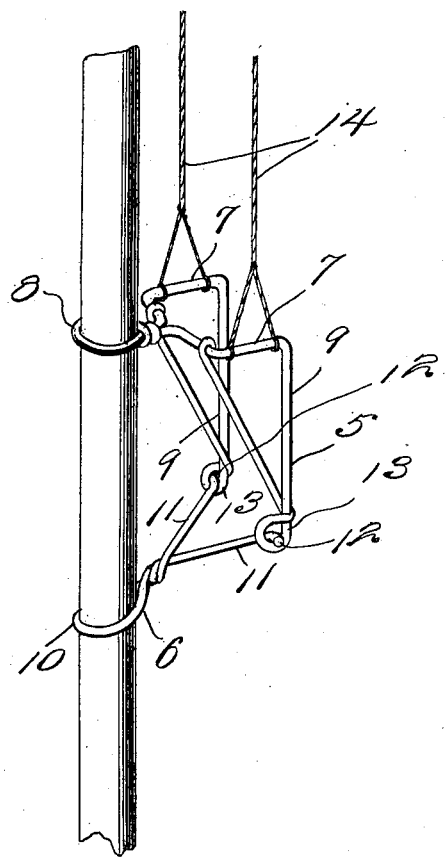

UNITED STATES PATENT OFFICE.

CLAUD CHAMP GRIFFIN, OF ATASCOSA, TEXAS.

PIPE-GRIP.

No. 827,011.  Specification of Letters Patent.  Patented July 24, 1906.

Application filed November 28, 1905. Serial No. 289,433.

*To all whom it may concern:*

Be it known that I, CLAUD CHAMP GRIFFIN, a citizen of the United States, residing at Atascosa, in the county of Bexar, State of Texas, have invented certain new and useful Improvements in Pipe-Grips; and I do hereby declare the following to be a full, clear, and exact description of the invention, such as will enable others skilled in the art to which it appertains to make and use the same.

This invention relates to grips, and more particularly to pipe-grips, and has for its object to provide a device of this kind by means of which pipe and other similarly-shaped bodies may be grasped to lift them.

A particular object is to provide a grip which will be simple and which may be manufactured at a low figure.

Other objects and advantages will be apparent from the following description.

In the drawing forming a portion of this specification there is shown a perspective view of the pipe-grip engaged with the pipe to lift the latter.

Referring now to the drawing, the present invention comprises two members 5 and 6, the former including an upper horizontal portion 7, having a horizontally-disposed eye 8 at its forward portion and having depending side pieces 9 at its rearward portion. The member 6 includes a forwardly-disposed horizontal eye 10 and rearwardly-divergent legs 11, having laterally-turned trunnions 12 at their rearward ends, which are engaged in eyes 13 in the portions 9. The member 6 is thus pivoted for vertical movement to bring its eye 10 into and out of exact registration with the eye 8. When these eyes 8 and 10 are in registration with each other, they may be engaged with a pipe or other cylindrical body, and if the member 5 be then raised the rearward portion of the member 6 will also be raised, which will throw this member out of a horizontal plane and tend to draw its eye 10 out of registration with the eye 8, which will cause the eye 10 to bind against the pipe, thus holding the latter against movement with respect to the grip. Lifting-cables 14 may be engaged with the upper horizontal portion 7 of the member 5, and, as shown in the drawing, the members 5 and 6 may be each formed of a single metallic rod bent into the desired shape.

What is claimed is—

1. A pipe-grip comprising a member including a horizontally-disposed eye, depending side portions connected with the eye and lying rearwardly thereof, and a lower member pivotally connected with the lower ends of the side portions, said lower member having an eye and being movable upon its pivot to bring its eye into and out of registration with the first-named eye.

2. A device of the class described comprising upper and lower members, the upper member having a horizontal portion provided with a horizontally-disposed eye at its forward end and depending side portions at its rearward portion, said lower member including a horizontally-disposed eye, and rearwardly-divergent legs carried by the eye, said legs having laterally-directed trunnions at their rearward ends pivotally engaged in the side portions of the upper member for movement of said lower member to bring its eye into and out of registration with the eye of the upper member.

In testimony whereof I affix my signature in presence of two witnesses.

CLAUD CHAMP GRIFFIN.

Witnesses:
R. A. REESE,
WM. SCHLESINGER.